United States Patent
Croton et al.

(10) Patent No.: US 6,209,424 B1
(45) Date of Patent: Apr. 3, 2001

(54) CLAMPING SCREWS

(75) Inventors: David Croton; Trevor Elam, both of Holmfirth (GB)

(73) Assignee: Sicame Electrical Developments Ltd., West Yorkshire (GB)

( * ) Notice: Subject to any disclaimer, the term of this patent is extended or adjusted under 35 U.S.C. 154(b) by 0 days.

(21) Appl. No.: 08/714,134

(22) PCT Filed: Nov. 24, 1994

(86) PCT No.: PCT/GB94/02608

§ 371 Date: Jul. 1, 1998

§ 102(e) Date: Jul. 1, 1998

(87) PCT Pub. No.: WO95/25229

PCT Pub. Date: Sep. 21, 1995

(30) Foreign Application Priority Data

Mar. 15, 1994 (GB) .................................. 9404979

(51) Int. Cl.$^7$ ..................................... B25B 13/04
(52) U.S. Cl. ................ 81/124.7; 81/437; 81/124.1; 81/119
(58) Field of Search .................. 81/124.7, 121.7, 81/124.6, 437, 124.1, 119, 451; 403/2; 411/2

(56) References Cited

U.S. PATENT DOCUMENTS

| 3,763,725 | * | 10/1973 | Reiland ............................ 81/124.6 |
| 3,865,007 | * | 2/1975 | Stanback .............................. 81/61 |
| 3,937,121 | | 2/1976 | Schubert . |
| 4,053,982 | * | 10/1977 | Weissman ............................. 411/2 |
| 4,179,955 | | 12/1979 | Akiyoshi et al. . |
| 4,742,735 | * | 5/1988 | Stencel ................................ 411/2 |
| 5,182,973 | * | 2/1993 | Martindell .......................... 81/451 |
| 5,372,466 | * | 12/1994 | O'Berry ............................... 411/2 |
| 5,520,075 | * | 5/1996 | Barmore ............................. 81/451 |
| 5,592,861 | * | 1/1997 | Barmore ........................... 81/124.6 |

FOREIGN PATENT DOCUMENTS 41 13 242 A1   10/1992  (DE) .

* cited by examiner

*Primary Examiner*—James G. Smith
*Assistant Examiner*—Lee Wilson
(74) *Attorney, Agent, or Firm*—Zarley, McKee, Thomte, Voorhees & Sease

(57) ABSTRACT

A screw clamping apparatus includes a shank and a drive member for exerting a driving force on a shank to screw the same into a bore to exert a clamping force on an article. The shank is provided to shear once a predetermined turning torque from the drive member, and hence clamping force, is achieved and the plane of shear can be accurately determined relative to the surface of the article on which the bore is formed and into which the shank is screwed. This is an advantage over the conventional clamping screw which is provided to shear at one fixed weakened location and, when sheared can leave an undesirable protruding portion above the surface of the article. The screw clamping apparatus of this invention allows one size shank to be used for clamping articles to different sizes and the position of the planar shear can be located at a position along the length of the shank, thereby eliminating the occurrence of protrusions when shear occurs.

22 Claims, 9 Drawing Sheets

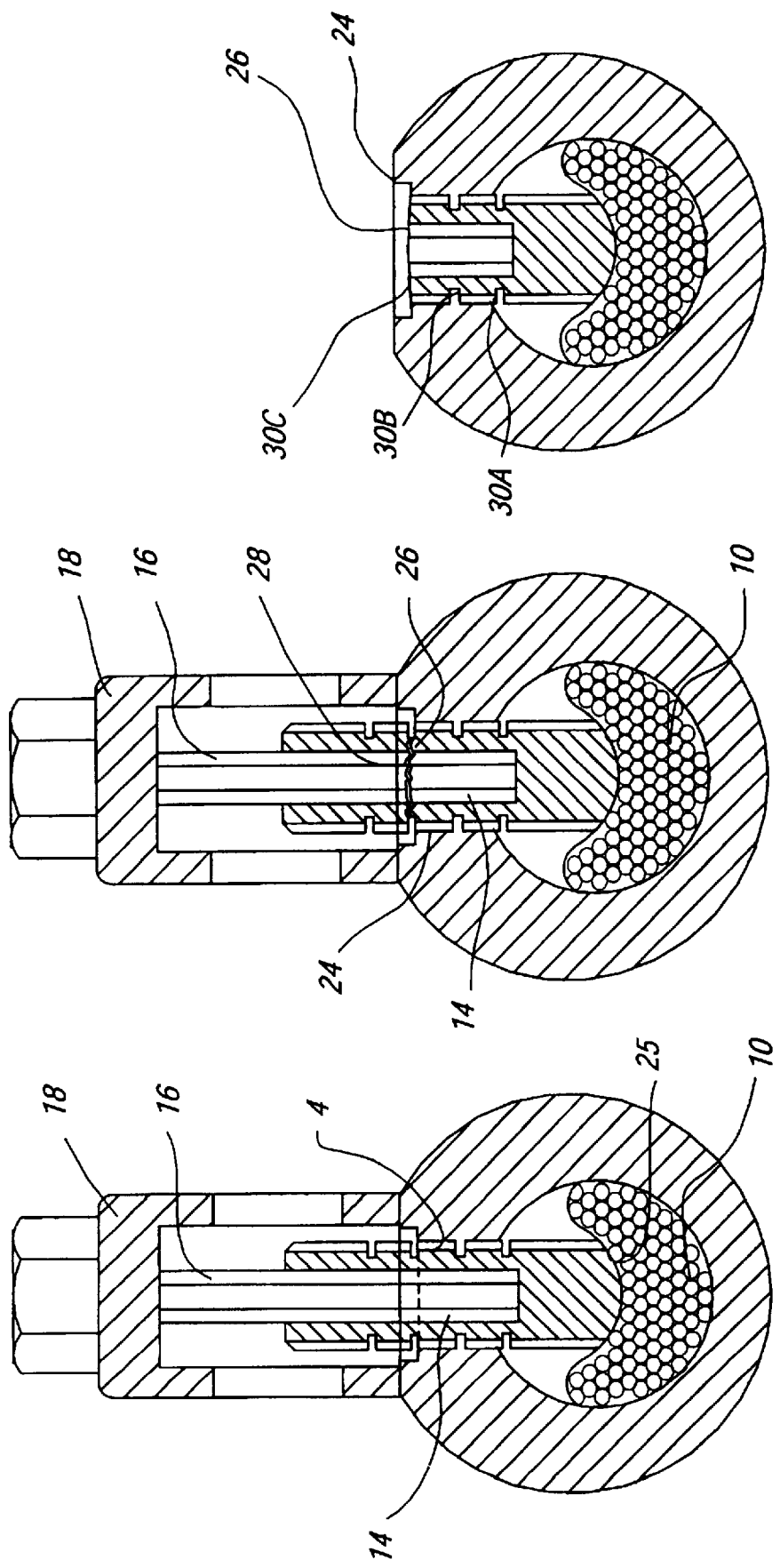

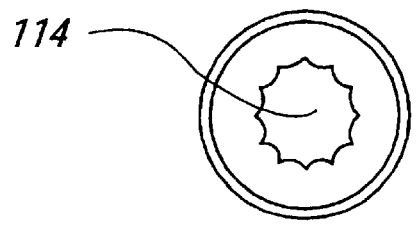
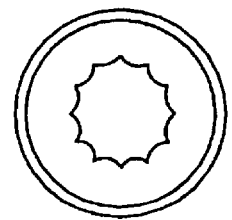
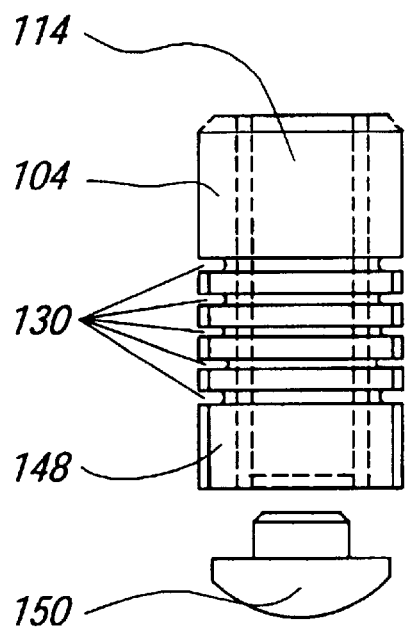
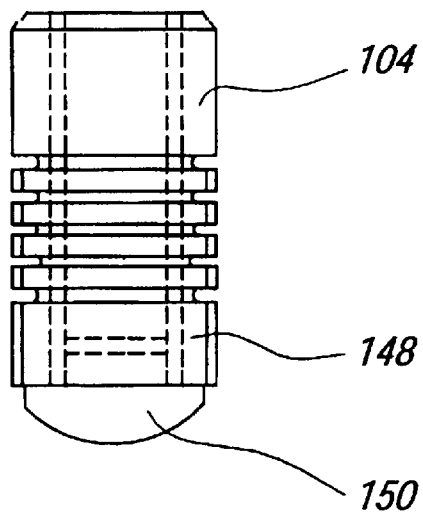
FIG. 13A  FIG. 13B

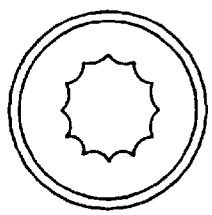
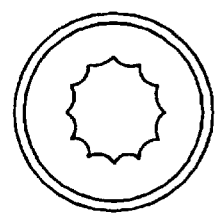
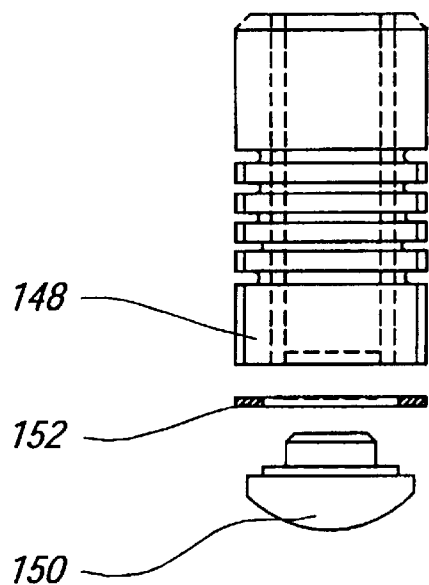
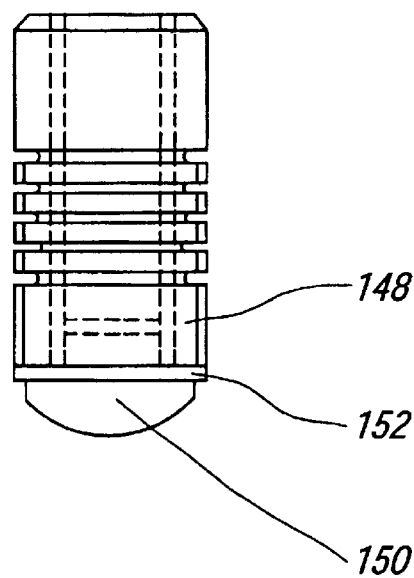
FIG. 14A      FIG. 14B

CLAMPING SCREWS

BACKGROUND OF THE INVENTION

The present invention relates to improvements in clamping screws or shear bolts used to exert a clamping force on an object or objects by the screwing and tightening of the bolt thereon.

As a conventional bolt is tightened to exert a clamping force on an object the torque required to further tighten the bolt increases. When the torque reaches a required level to provide the clamping force the conventional shear bolts are provided with reduced necks and shear at this point such that the head portion is removed. The shearing action of the bolt is commonly succesful but the position of the shear is entirely dependent upon the positioning of the neck.

This causes problems in many uses and when the article upon which the bolts are used is an electrical cable connector and the objects to be clamped are cable cores, the shank of the bolt which remains can protrude above the surface of the connector. When a connector is used, portions of the two cable cores to be connected are placed in the connector and covered and shear bolts are applied to the connector to be screwed into threaded bores therein to provide a clamping force onto the cores and hold the same in place. When a certain clamping torque is reached the bolt shears at the neck and can leave part of the bolt shank protruding above the surface of the connector. The existence of these protrusions cause particular concern when used with high voltage cable connectors as each of the protrusions can cause what is known as a "corona" effect to occur. A corona effect occurs due to the attraction of high voltage stresses at points which are of a different form than the connector such as the protrusions caused by the sheared bolts. The corona effect leads to the insulation material around and adjacent the protrusions being eroded and destroyed by the high voltage stresses.

Further problems are caused when it is desired that the connector be coated by a heat shrinkable insulating material or placed in a close fitting sleeve of insulating material to protect the same once the cable cores are in position. The existence of the protrusions on the connector can produce protrusions on the insulating material which are undesirable or may prevent the fitting of the sleeve.

In an attempt to overcome these problems it is possible to use packing pieces in conjunction with the bolt when the cable core to be clamped is a relatively small diameter cable compared to the bore of the connector and/or to use differing lengths of bolts for each diameter of cable core to be clamped. These are not ideal solutions as the use of additional components adds time to the fitting of the bolts and the range of sizes of bolts which now exist is excessively large and expensive to stock.

The aim of the present invention is to provide a bolt or screw clamping means for use in clamping an object in position, said bolt being provided with means to allow at least a portion to shear off once a predesignated clamping torque is reached and to provide drive means for the same, the said apparatus of a form to allow the position and plane of the shear to be controlled and predicted thereby eliminating the production of protrusions on the surface of the article when the bolt shears.

SUMMARY OF THE INVENTION

The present invention provides a screw clamping apparatus comprising a screw shank and a drive means connectable to the shank for transmission of torque from the drive means to the shank to screw it into a bore in an article to apply a clamping effect, and when the shank applies a predetermined turning torque to produce a clamping force the shank shears in a transverse shear plane with continued turning of the drive means, wherein the axial position of the shank is movable relative to the drive means and the drive means can seat on the article adjacent the bore, whereby said shear plane is created substantially in the plane of the surface of the article around said bore regardless of the extent to which the shank, within a predetermined range, enters the bore.

According to a first embodiment, the drive means comprises a drive rod of non circular section slidable in a recess axially of the shank whereby the shank is driven by rotation of the drive rod, and a support rotatably supports the drive rod and is adapted to seat the article surface adjacent the bore.

In this embodiment the screw clamping means comprises the threaded shank and the drive means, the drive means including a drive rod for engagement in the axial recess in said shank and a support means, wherein the support means and the drive rod are rotated together to tighten the shank to bring the support means into contact with the surface of the article adjacent the bore; continued driving of the drive means causing the shank to shear when a predesignated clamping force is reached. Alternatively the support means is held in a fixed position and the drive rod only is driven.

Typically the shank is caused to shear on a plane substantially defined by the end of the drive rod of the drive means which is positioned in the axial recess of the shank. In this embodiment it is the position of the end of the drive rod which determines the plane of shear of the shank. The position of the end of the rod may be provided to lie directly along the plane of the surface of the article or slightly below the plane but still substantially in the same plane of the surface of the article. This arrangement ensures that the top of the sheared shank does not protrude above the surface of the article and, if the article has a curved surface, that the top of the sheared shank lies on or below the lowest point of the bore edge.

In one embodiment the support means comprises a plurality of downwardly depending legs the ends of which rest on the article to which the shank is applied.

Alternatively the support means is a downwardly depending skirt which passes substantially around the drive rod.

Typically the drive rod and the axial recess of the shank have a polygonal cross section such as, for example, hexagonal or 12 sided.

Typically the length of the drive rod relative to the article determines the plane of shear upon a predesignated clamping torque level being reached. In all cases the shank will shear in a plane substantially parallel with the end of the drive rod.

In one embodiment the drive means is provided in the form of a drive socket and said shank is provided on the outer surface thereof with a drive formation for the location of drive means therewith. In one embodiment the drive formation is in the form of a head at the end of the shank which is of polygonal cross section and may also have an aperture for the reception of an allum key and in an alternative form the engagement portion is formed along part of the length of the outer surface of the shank.

In one embodiment the axial recess passes through the length of the bolt and the end of the shank is plugged. In one embodiment the plug is formed of brass to provide electrical contact with the clamped article. In one embodiment there is provided an insert which contacts with the bore as it passes therethrough and when the shank is fixed into the bore prevents release of the same due to vibratory action. Typically the insert is a washer held between the plug and the shank at the end thereof.

The shear torque or clamping force at which the shank is designed to shear is defined by the relative sizes of the axial aperture and outside diameter of the shank and the material from which the shank is manufactured.

In any embodiment the shank is preferably provided with at least one weakened point along the length thereof to encourage the shank to shear at those points. Typically the weakened points are notches cut into either or both of the outer surface of the shank or along the wall of the axial recess in the shank.

When used on an electrical cable core connector, the cable cores are clamped in position and the notches are preferably positioned to ensure the shank shears at known positions and these positions can be calculated when used in a connector of known size and for cable cores of known characteristics such that the notches are spaced to ensure that the shank shears in a predicted position in relation to the surface of the article and above the threaded section of the bore. For example, as cables are manufactured in a limited number of defined sizes notches are provided on the shank to match with the length of shank required to provide the necessary clamping force on a particular cable core cross sectional area in a particular connector, and the notches are spaced such that there is always one notch between the end of the drive rod and the start of the threaded section on the bore and it is this notch which shears at a position adjacent the surface of the connector and substantially in the plane of the end of the drive rod to give a smooth and uniform connector surface.

A further aspect of the invention is that if the shank is provided with an axial recess, the recess, which is exposed once the shank has sheared can be re-engaged subsequently by the drive means and rotation of the drive means causes the removal of the shank from the connector. This is of particular advantage where a temporary electrical connection is required to be made and then subsequently changed.

In a further embodiment the drive means comprises a drive nut threaded to the shank wherein the connection between the shank and nut is designed to have a frictional resistance greater than that between the shank and said bore so that in threading the shank into the bore the nut turns with the shank until the required clamping force has been applied, wherein the nut turns on the shank and moves axially thereof until it seats on the article which continued turning effects said shearing of the shank.

Typically the shank is provided with an axial recess to aid the shearing of the shank.

Preferably the nut used in this embodiment is a Nylock nut, or, alternatively, a locknut where a portion of the thread on the shank is distorted to achieve a high torque locking action.

Alternatively the drive means is a nut which is slidably mounted on, but drivingly connected to, the shank. Preferably the nut is provided with lugs located with slots provided axially on the shank. In one embodiment the slots are provided in a helical path along the shank.

In a further aspect of the invention there is provided a drive means incorporating a drive rod and a support means wherein said drive means can be used for the driving of a threaded shank into a bore to exert a clamping force, said drive transmitted by the fitting of the drive rod into an axial recess in said shank and the end of the drive rod defines the plane of shear of the shank upon continued turning of the rod once a predesignated clamping force is reached.

In one embodiment the drive means comprises a drive rod and a support means disposed around said drive rod, said support means and drive rod depending downwardly from a drive handle connected thereto.

Preferably the drive rod is axially movable relative to the support means, between a first position where the end of the drive rod is substantially level with the end of the support means, for tightening and shearing the shank, and a second position where the end of the drive rod protrudes below the level of the skirt to allow removal of a previously sheared shank. Typically the drive rod is movable between first and second positions along a predetermined path formed in a housing or in the support means mounted on the drive handle.

In one preferred feature the support means are releasable to allow removal and replacement of the same.

Preferably the drive means is reusable for the driving and shearing of a plurality of threaded shanks.

A further aspect of the invention is the provision of a shank for use to exert a clamping force on an article, said shank including a drive formation for the location of drive means therewith, a threaded section along at least part of the outer wall and a series of weakened sections along the length thereof to encourage the shank to shear at one of said weakened sections when a predetermined clamping force is reached.

In one embodiment the drive formation is an axial recess.

BRIEF DESCRIPTION OF THE DRAWINGS

FIG. 3 illustrates a cross sectional elevation of the embodiment of FIG. 1 in a third position;

FIG. 4 illustrates a cross sectional elevation of the embodiment of FIG. 1 at the point of shear;

FIG. 5 illustrates a cross sectional elevation of the embodiment of FIG. 1 in a final position;

FIGS. 13 A and 13B illustrate an embodiment of a shank as used in the apparatus of FIG. 6;

FIGS. 14A and 14B illustrate an alternative embodiment of a shank;

DETAILED DESCRIPTION OF THE PREFERRED EMBODIMENTS

Figure 1:
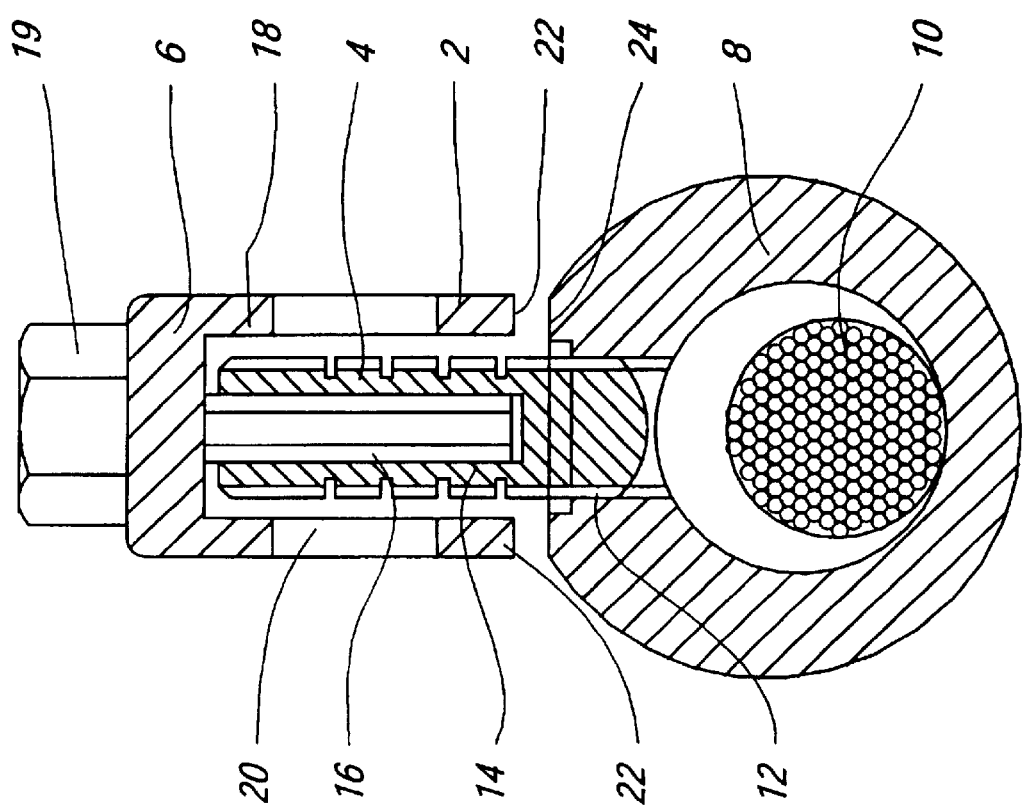
FIG. 1 illustrates a cross sectional elevation of the screw clamping means of the invention in one embodiment in a first position.

Referring firstly to FIG. 1 there is shown a first embodiment of the screw clamping means 2 of the invention. The screw clamping means comprises a shank 4 and drive means 6 for the said shank. In this embodiment the shank 4 is to be inserted into an electric cable core connector 8 to exert a clamping force on the cable core 10. The shank 4 includes an axial recess 14 which has a hexagonal cross section and is threaded to be screwed into the threaded bore 12 in the connector 8.

The drive means 6 comprises a drive rod 16 with a drive formation in this case in the form of a head 19 and a support means 18. The drive rod is provided with a hexagonal cross section similar to that of the recess 14 in the shank so that the rod 16 fits into and is axially movable in relation to, the axial recess 14. Rotation of the drive rod causes a screwing drive to be transmitted to the shank 4 via the recess and hence the shank 4 is screwed into the bore 12. The support means 18 comprises a downwardly extending skirt 20 or legs (not shown). In use, the bottom edges 22 of the skirt rest on the surface 24 of the connector. The support means 18 can be rotatable with the drive rod 16 if desired or may be held stationary with the drive rod 16 rotatable relative thereto.

FIG. 1 illustrates the shank 4 and drive means 6 in a first position wherein the drive rod 16 is fitted into the axial recess 14 of the shank 4. Preferably the shank is introduced into the bore 12 to provide a secure starting location. The drive means 6 is then rotated in a clockwise direction to commence screwing of the shank 4 into the bore 12. The rotational action is translated to the shank by the engagement of the rod 16 with the walls of the axial recess 14.

Figure 2:
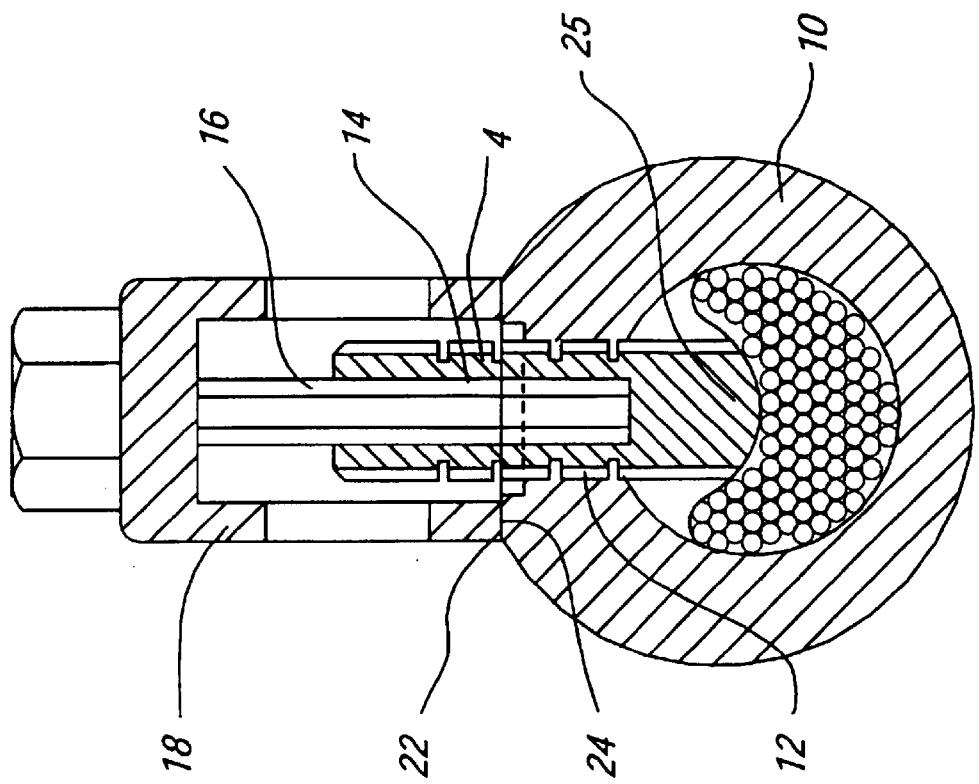
FIG. 2 illustrates a cross sectional elevation of the embodiment of FIG. 1 in a second position.

The rotation of the drive means causes the shank 4 to move into the connector as shown in FIG. 2. At this stage the support means 18 has moved down such that the bottom edges 22 now rest on the connector surface 24 adjacent the bore 12. At this point the drive rod 16 is prevented from moving any further downwardly with the shank 4 and further turning of the drive means causes continued downward screwing of the shank 4 and produces relative axial movement between the rod 16 and shank recess 14 as shown.

Continued turning of the drive means 6 moves the clamping end 25 of the shank 4 into contact with the cable core 10, causing the same to deform, and then exert a clamping force thereon as shown in FIG. 3.

Every size of cable core 10 is required to be clamped to a predesignated torque level to produce the required clamping force and at that torque the shank is required to shear thereby holding the core in this clamped position. In this invention the torque level at which the shank 4 will shear is determined by the difference between the width of the recess 14 and the outer diameter of the shank 4 and also the material from which the shank is made. The next step is to control the position at which the shear occurs.

FIG. 4 illustrates the embodiment of FIGS. 1–3 at a position where the predesignated clamping torque on the core 10 has been reached and shear as indicated by line 26 is about to occur upon continued turning of the drive rod 16. The plane of shear is determined by the position of the end 28 of the rod 16 which is in the axial recess 14 of the shank 4 and the position of which is known and fixed due to the support means 18. The support means 18 is provided to rest on the connector surface 24 so the position of the end 28 of the drive rod 16 is determined relative to the connector and hence the plane of shear 26 in this embodiment is substantially level with the surface 24 as required.

The shank 4 when sheared is shown in FIG. 5 and the plane of shear 26 is substantially level with the surface 24 as desired. To further encourage the plane of shear to be located at a predictable location on the shank, the shank is provided with sets of notches 30. The selection of the location of these notches is described in more detail later. However in FIG. 5 the notch 30A is positioned foruse when clamping the biggest cable core cross section namely 150 mm, the notch 30B is for the intermediate cross section 120 mm and the notch 30C, which in this case is at the shear plane 26, is for inducing shear with a 90 mm cross sectional cable core.

Figure 6:
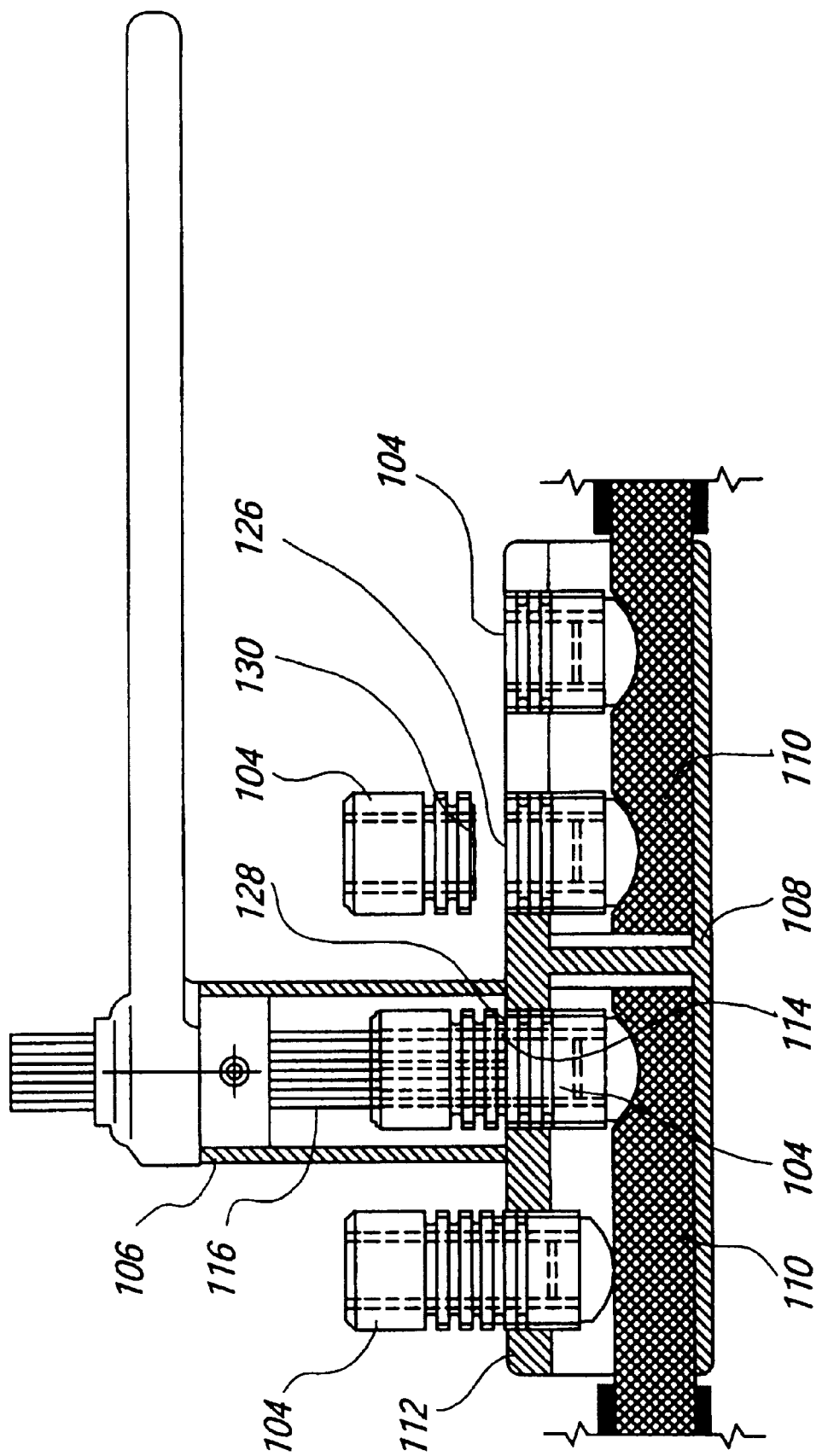
FIG. 6 illustrates a cross sectional elevation of a screw clamping apparatus in a second embodiment with a plurality of threaded shanks in various stages of screwing into bores on an electrical connnector.

Referring now to FIG. 6 there is shown a second embodiment of screw clamping apparatus which comprises the components of the first embodiment but in different forms. The apparatus comprises a drive means 106 and a shank 104. The figure shows a plurality of shanks 104 at various stages of tightening into bores 112 in an electrical connector 108 to exert clamping forces on cable cores 110. Commencing from the shank 104 on the left and passing to the right, the first shank 104 is shown screwed manually into location with the threaded bore 112 but exerts no clamping force on the core 110. The second shank is shown with the drive rod 116 engaged in the axial recess 114 of the shank. In this case both the drive rod 116 and axial recess 114 have 12 sided cross sections and this allows the drivable engagement between the two which results in the shank being driven into the bore to exert a clamping force on the core. As shown the predetermined turning torque required to be exerted to produce the required clamping force has not been reached hence no shear has occurred.

The third shank 104 is shown in a sheared form wherein the shear plane 126 is substantially level with the surface of the connector 108. The shank shears upon continued turning of the drive rod 116 once the predetermined turning torque has been reached and occurs in the plane of the end 128 of the drive rod 116 and hence the shank shears along the weakening notch 130 which is located on the shank to lie in the required position.

The fourth shank 104 is shown with the sheared portion removed and illustrates the manner in which no part of the shank protrudes above the level of the plane of the connector 108.

Figure 7B:
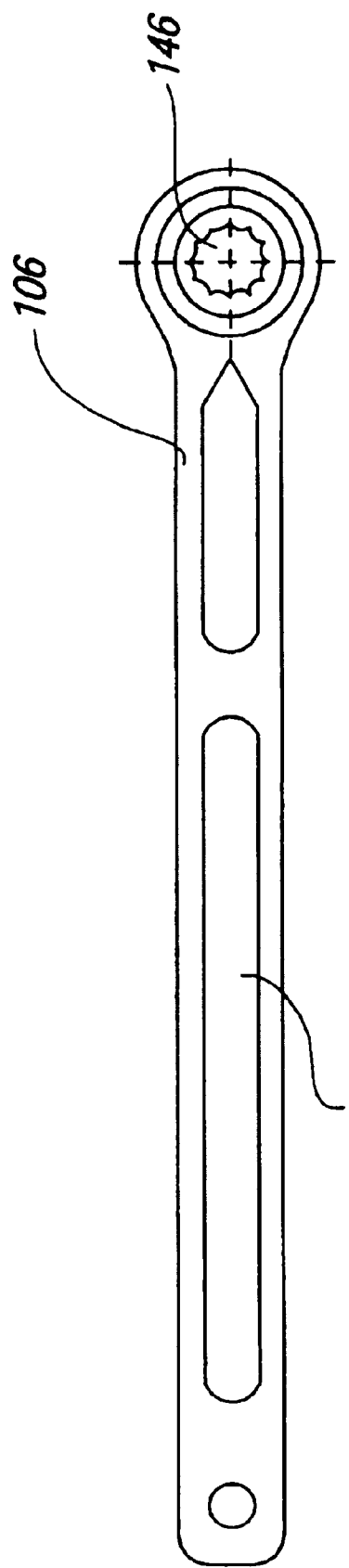
FIGS. 7A and 7B illustrate an elevation and plan of an embodiment of a drive means.
Figure 7A:
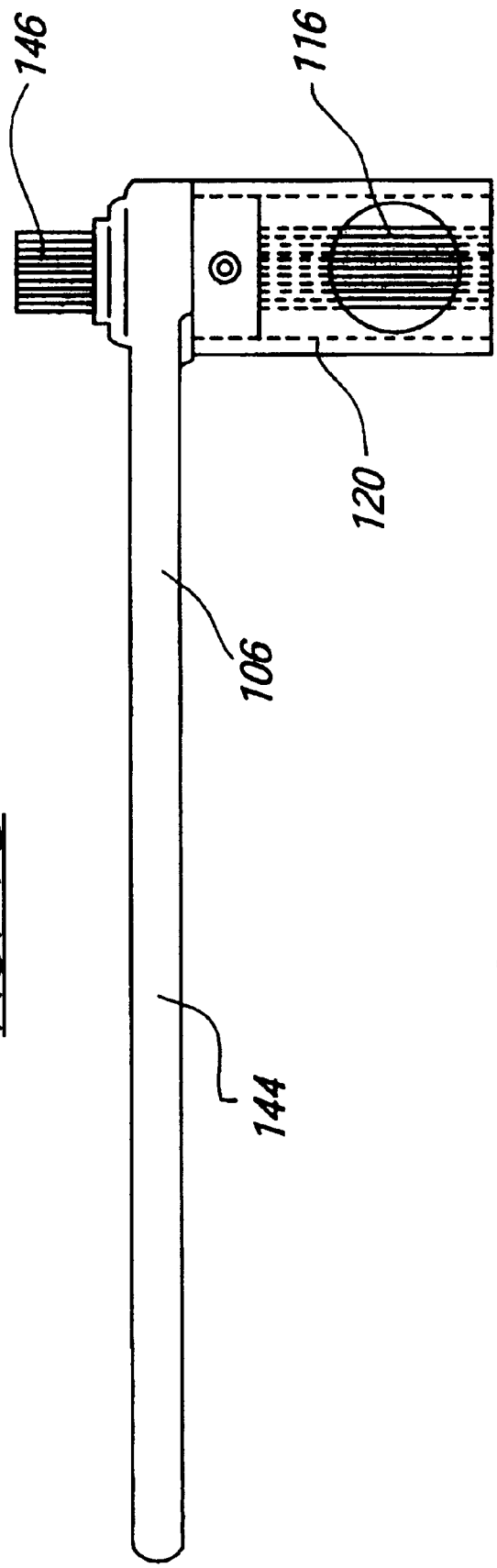

FIGS. 7A and 7B show in elevation and plan an embodiment of the drive means 106. The drive means includes a polygonal sided drive rod 116 which is substantially surrounded by a support means in the form of a skirt 120. In this embodiment the end of the skirt and the drive rod lie in the same plane but it is possible that in certain embodiments and uses the end of the drive rod may be required to be in a different plane to the end of the skirt if a different position of shear plane is required than being level with the skirt seat on the article.

Both the skirt 120 and drive rod 116 depend from an elongate handle portion 144. The handle portion 144 can, in one embodiment, be provided in a fixed position relative to the skirt and drive rod such that the components move together or, alternatively, a conventional ratchet mechanism is incorporated between the handle and the drive rod to allow selected engagement between the handle portion 144 and drive rod 116 and, if required, skirt 120.

On the side of the handle 144 opposite the drive rod 116 there is provided a release rod 146 which is engagable in the axial recess 114 of a sheared shank 104 to allow the sheared shank to be unscrewed from the bore 112.

Figure 10:
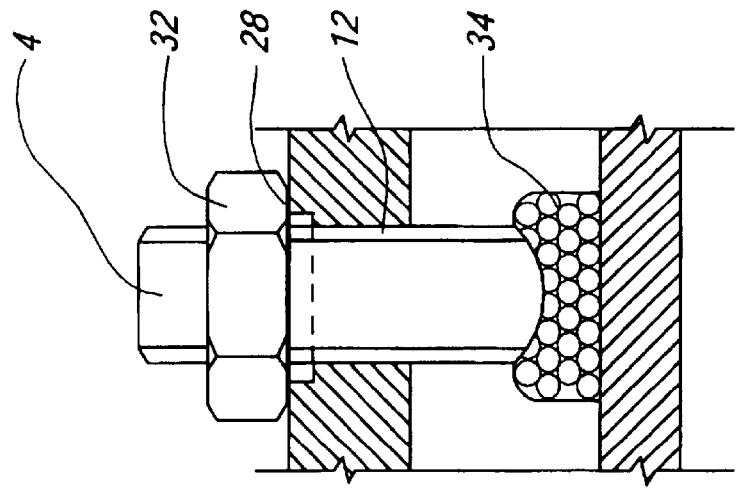
FIG. 10 illustrates an elevation of the embodiment of FIG. 8 in a third position.
Figure 9:
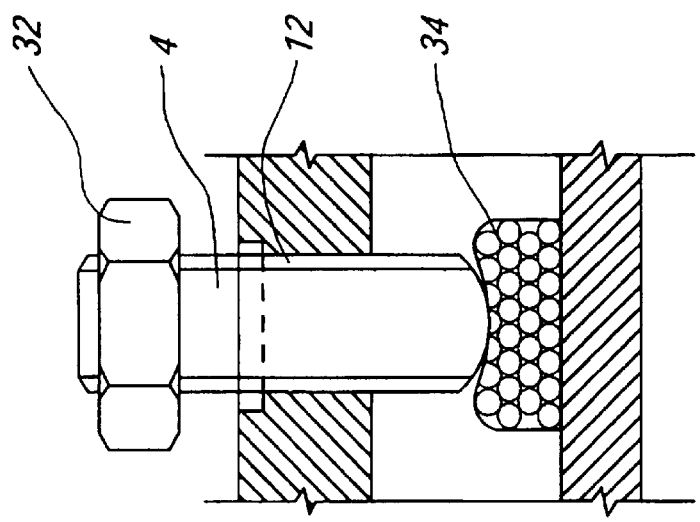
FIG. 9 illustrates an elevation of the embodiment of FIG. 8 in a second position.
Figure 8:
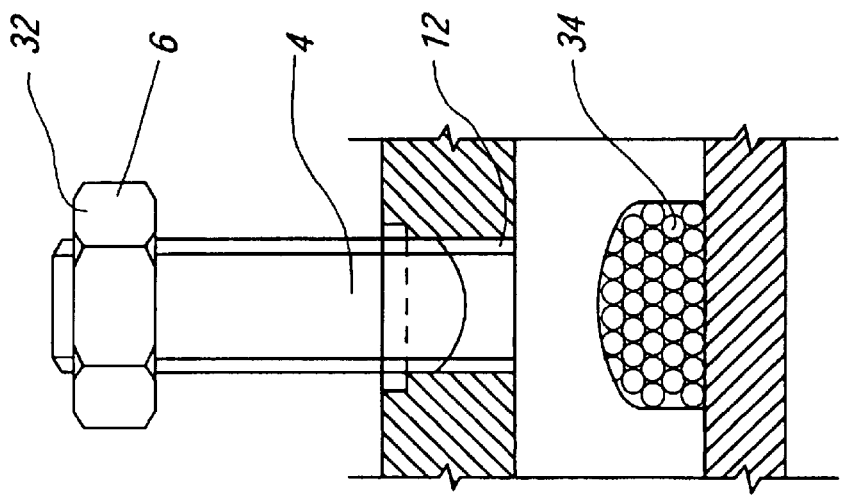
FIG. 8 illustrates an elevation of a further embodiment of the invention in a first position.

A third embodiment of the invention is shown in FIGS. 8–10 wherein the drive means 6 is in the form of a nut 32 which is threadably mounted on the shank 4. In the first instance the nut is rotatable in conjunction with the shank such that rotation of the same causes the shank to be driven into the bore 12 of the article to pass downwardly, as in FIG. 9, to exert a clamping force on an object 34.

As the clamping force increases and approaches a pre-designated level at which shear of the shank 4 is required, continued rotation of the nut 32 causes the clamping force to be maintained while at the same time the nut starts to screw down the threaded shank to come to rest on the surface 28 of the article as shown in FIG. 10. In this position the nut 32 is prevented by the article from passing further down the shank 4 and hence continued rotation of the nut 32 causes the shank to shear in a plane defined by the end 28 of the nut and the surface of the article. In this embodiment the end 28 of the nut 32 acts as the determining factor of the position of the plane of shear of the shank 4.

Figure 11:
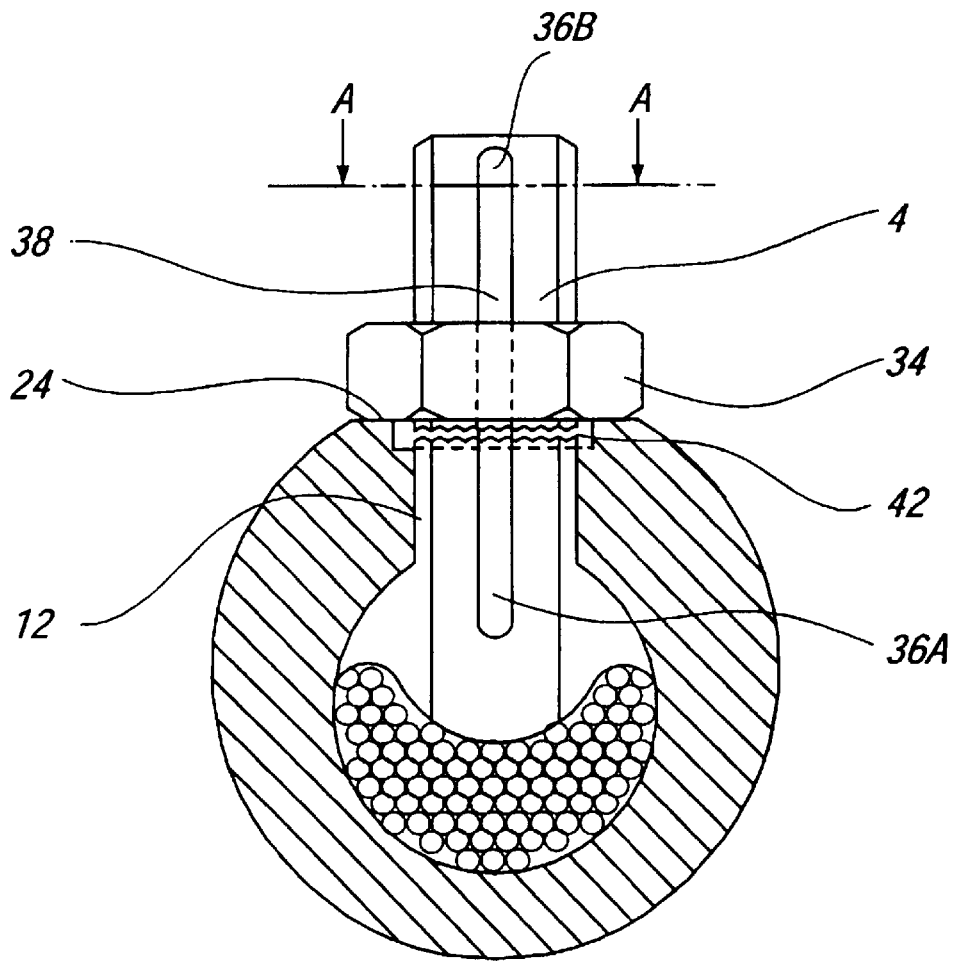
FIG. 11 illustrates a sectional elevation of a further embodiment of the invention at the point of shear.
Figure 12:
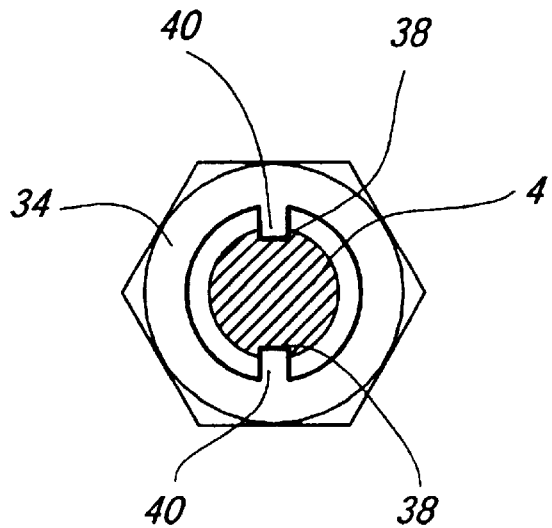
FIG. 12 illustrates a sectional plan view on AA of the embodiment of FIG. 11.

FIGS. 11 and 12 illustrate a further embodiment of the invention which again utilises a drive means in the form of a nut 34. In this embodiment the nut is mounted on the shank to allow the nut 34 to be slidably axially movable along the shank 4. As shown in FIG. 11 the nut 34 is movable between a first position 36a to a second position 36b. The nut is provided with inwardly facing lugs 40 which engage in drive formation means in the form of slots 38 provided in the shank as shown in FIG. 12 to allow axial movement of the nut between the first 36a and second 36b positions. The lugs 40 also ensure that turning of the nut 34 causes the turning action to be transmitted via the slots 38 to the shank 4 to screw the same into the bore 12. In use the the shank is introduced into the bore 12 to provide a secure starting position. The nut 34 is moved to a first position 36a and turned to screw the shank 4 into the bore 12 and hence bring the nut in to contact with the surface 24 as shown in FIG. 11. Continued turning of the nut 34 causes the shank to be continued to be screwed into the bore and as this happens the nut 34 slides upwardly along the slots 38 thereby maintaining the nut 34 in contact with the surface 24. When the required clamping force on the cable core 10 has been reached continued turning of the nut 34 causes the shank to shear as shown by line 42. By maintaining the nut in contact with surface 24 so the plane of shear is located on a plane level with the surface 24 thereby providing a neat and level sheared shank as required.

Although the slots 38 shown are axial it is possible that the slots 38 can be provided in a helical path along the shank 4 to allow the movement of the nut along the shank 4 to be improved during turning of the nut.

FIGS. 13A and 13B illustrate one embodiment of a shank of the type shown in FIG. 6 wherein the shank 104 includes a main portion 148 with an axial recess 114 passing therethrough. On the outer surface of the portion 148, a series of notches 130 are provided. Each notch is provided at a position along the shank which equates with a position at which shear is preferably to occur with regard to different size cable cores and on known connectors. In this case it is required that the notches are positioned such that when the clamping force on a core has reached a predetermined level one of the notches lies in a plane substantially level with the surface of the connector. For example, if the shank shown in FIGS. 13A and 13B is usable for clamping five standard sized types of cores with known cross sectional areas in a connector as shown in FIG. 6, a notch is positioned along the shank at a location for each size. Thus when the turning torque for the required clamping force is reached and shear is to occur a notch will be in position substantially on the plane of the surface of the article and the end of the drive rod to ensure that the shear position and shear surface which occurs is properly located and relatively flat. As there are a limited number of cable core sizes and connector sizes the provision of notches to encourage the shear plane to be induced at these particular locations is practical and advantageous.

Figure 15:
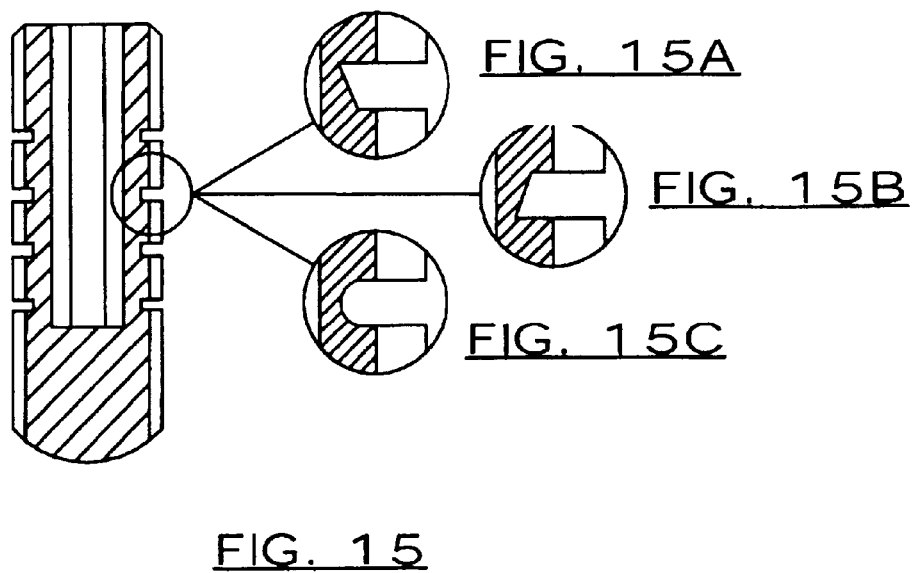
FIGS. 15A, 15B and 15C illustrate forms of weakening points on a shank.

FIGS. 15A, 15B and 15C show alternative forms of weakening notches (30,130) which can be provided on a shank.

Referring again to FIGS. 13A and 13B the end of the portion 148 which is to contact the article to be clamped is plugged by a plug insert 150 which fits partially into the axial recess 114. The plug can also include teeth formed therein to improve the clamping effect and, if used in clamping cable cores, to improve the electrical contact.

FIGS. 14A and 14B illustrate a shank 104 as in FIGS. 13A and 13B with an additional component in the form of a washer 152 which fits between the plug insert 150 and the main shank portion 148. The outer edge of the washer protrudes sufficiently to ensure that once the shank is screwed into the bore 112 of the article the same will not be unscrewed due to vibration and hence only positive unscrewing action can cause the removal of the shank.

Figures 16A, 16B:
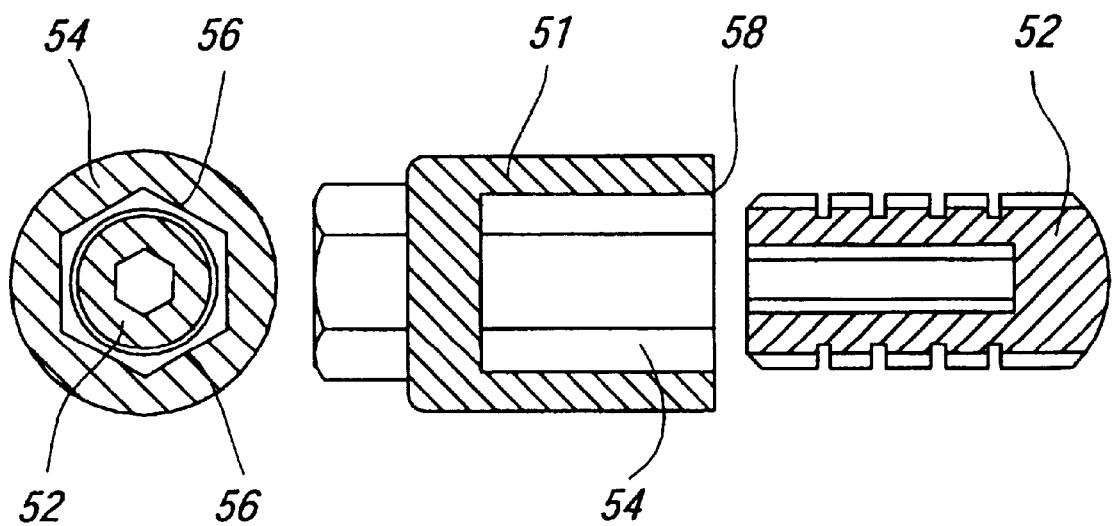
FIGS. 16A and 16B illustrate a further embodiment of the invention.

FIGS. 16A and 16B illustrate a further embodiment of the invention wherein the drive means 51 are in the form of a socket 54 which passes over the shank 52. The outer surface of the shank 52 has drive formations 56 therealong with which which the inner walls of the socket 54 engage. When engaged the shank lies within the socket 54 as shown in section in FIG. 16B and rotation of the socket causes the shank 52 to be driven into the bore of the article as in the other embodiments. When the base 58 of the socket meets the article, continued turning of the socket continues to drive the shank 52 into the bore to exert a clamping force until a predetermined turning torque is reached, at which point the shank shears substantially in the plane of the surface of the article and the base 58 of the socket 54.

The invention provides a screw clamping means for an object comprising a shank which is required to shear once a predetermined turning torque to create a clamping force on the article is reached and drive means for the shank and the two components are provided for relative axial movement to occur such that the plane of shear of the shank is determined by the position of the drive means relative thereto. The type of material of the shank, size of article and the characteristics of the article to be clamped can all be used to determine positions for shear along the shank. None of the prior art shear bolts can provide this advantage of controlling the plane of shear to suit the conditions in which the bolts are used.

What is claimed is:

1. A screw clamping apparatus comprising a screw shank and having a drive engagement formation formed along at least a portion thereof, a drive means connectable to the shank along the drive engagement formation for transmission of torque from the drive means to the shank to screw it into a bore in an article to apply a clamping effect, and, when the shank applies a predetermined turning torque to produce a clamping force the shank shears in a transverse shear plane with continued turning of the drive means and characterized in that, upon turning of the drive means, the drive means and the shank are relatively axially movable and said drive means is positionable relative to the article such that an end of the drive means in contact with the shank is positioned relative to the article, whereby said transverse shear plane is created substantially in a plane of the end of the drive means which is in contact with the shank regardless of the extent to which the drive engagement formation portion of the shank enters the bore.

2. A screw clamping apparatus according to claim 1 wherein the drive means comprises a drive rod and a support means, said drive rod of non-circular section and slidable in a recess axially of the shank whereby the shank is driven by rotation of the drive rod.

3. A screw clamping apparatus according to claim 2 wherein the shank is caused to shear on a plane substantially defined by the end of the drive rod of the drive means which is positioned in the axial recess of the shank.

4. A screw clamping apparatus according to claim 2 wherein the support means comprises a plurality of downwardly depending legs, the ends of which rest on the article to which the shank is applied.

5. A screw clamping apparatus according to claim 2 wherein the support means is formed as a downwardly depending skirt which passes substantially around the drive rod.

6. A screw clamping apparatus according to claim 2 wherein the axial recess runs through the length of the shank and the end of the shank which is inserted into the article is plugged.

7. A screw clamping apparatus according to claim 6 wherein the plugged end of the shank is formed of brass to provide electrical contact with the article clamped by the shank.

8. A screw clamping apparatus according to claim 2 wherein the axial recess is exposed once the shank has sheared and allows the subsequent re-engagement with drive means and rotation of the drive means to remove the shank from the bore.

9. A screw clamping appratus according to claim 1 wherein said apparatus comprises a threaded shank and a drive means, the drive means including a drive rod for engagement in a axial recess in said shank and a support means, wherein the support means and the drive rod are rotated together to tighten the shank to bring the support means into contact with the surface of the article adjacent the bore; continued driving of the drive means causing the shank to shear when a predesignated clamping force is reached.

10. A screw clamping apparatus according to claim 9 wherein the drive rod and the axial recess of the shank have a polygonal cross section.

11. A screw clamping apparatus according to claim 9 wherein the position of the drive rod relative to the article determines the plane of shear upon a predetermined clamping torque being reached.

12. A screw clamping apparatus according to claim 1 wherein said shank is provided on the outer surface thereof with a drive formation for location of drive means therewith.

13. A screw clamping apparatus according to claim 1 wherein the shank has an end that has an insert thereon which contacts the bore of the article to prevent release of the shank from the article due to vibratory effect once the shank has been inserted into the bore in the article.

14. A screw clamping apparatus according to claim 1 wherein the drive means comprises a drive nut threaded to the shank wherein the connection between the shank and nut is designed to have a frictional resistance greater than that between the shank and said bore so that in threading the shank into the bore the nut turns with the shank until the required clamping force has been applied, whereupon the nut turns on the shank and moves axially thereof until it seats on the article which continued turning effects said shearing of the shank.

15. A screw clamping apparatus according to claim 14 wherein the shank is provided with a axial recess to aid the shearing of the shank.

16. A screw clamping apparatus according to claim 14 wherein the nut is a locking nut wherein a high torque locking action is achieved.

17. A screw clamping apparatus according to claim 1 wherein the apparatus comprises a threaded shank and a drive means, the drive means including a drive rod for engagement in a axial recess in said shank and a support means, wherein the drive rod is rotated to tighten the shank and the support means are held in a fixed position such that continued driving of the drive means causes the shank to shear when a predetermined clamping force is reached.

18. A screw clamping apparatus according to claim 1 wherein the drive means comprises a drive member which is slidably mounted on, and drivingly connected to, the shank.

19. A screw clamping apparatus according to claim 1 wherein the drive means is provided with lugs disposed in slots provided axially on the shank on a helical path along the length thereof.

20. A screw clamping apparatus according to claim 1 wherein the shank is provided with at least one weakened point along the length thereof to encourage the shank to shear.

21. A screw clamping apparatus according to claim 20 wherein the weakened points are notches.

22. A screw clamping apparatus according to claim 21 wherein the notches are positioned and proportioned to ensure the shank shears at a location relative to the article when the dimensions of the article and the characteristics of an article to be clamped are known.

* * * * *